(12) United States Patent
Son

(10) Patent No.: US 9,085,205 B2
(45) Date of Patent: Jul. 21, 2015

(54) TIRE TREAD TEMPERATURE SENSOR AND DIAGNOSTICS FOR IN-VEHICLE DISPLAY

(71) Applicant: Continental Automotive Systems, Inc., Auburn Hills, MI (US)

(72) Inventor: Young Son, Glenview, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 104 days.

(21) Appl. No.: 13/725,941

(22) Filed: Dec. 21, 2012

(65) Prior Publication Data

US 2014/0180534 A1 Jun. 26, 2014

(51) Int. Cl.
*B60C 23/20* (2006.01)

(52) U.S. Cl.
CPC ...................... *B60C 23/20* (2013.01)

(58) Field of Classification Search
CPC ...................................... B60C 23/20
See application file for complete search history.

(56) References Cited

U.S. PATENT DOCUMENTS

| | | | |
|---|---|---|---|
| 4,673,298 A | 6/1987 | Hunter et al. | |
| 5,743,645 A * | 4/1998 | Jaynes | 374/137 |
| 6,883,962 B2 * | 4/2005 | Kurata | 374/57 |
| 6,963,273 B2 * | 11/2005 | O'Brien et al. | 340/443 |
| 7,535,344 B2 * | 5/2009 | Obradovich | 340/426.33 |
| 8,156,785 B1 * | 4/2012 | Wolyniec et al. | 73/9 |
| 8,718,870 B2 * | 5/2014 | Igarashi | 701/36 |
| 2001/0022802 A1 * | 9/2001 | Kurata | 374/45 |
| 2002/0066507 A1 * | 6/2002 | Sievi-Korte et al. | 152/209.16 |
| 2003/0021330 A1 * | 1/2003 | Aubel et al. | 374/142 |
| 2004/0061601 A1 * | 4/2004 | Freakes et al. | 340/442 |
| 2004/0196147 A1 * | 10/2004 | Albuquerque | 340/442 |
| 2004/0196148 A1 * | 10/2004 | Albuquerque | 340/442 |
| 2005/0088292 A1 * | 4/2005 | O'Brien et al. | 340/443 |
| 2005/0264472 A1 * | 12/2005 | Rast | 345/30 |
| 2006/0114107 A1 * | 6/2006 | Kim et al. | 340/457 |
| 2007/0251621 A1 * | 11/2007 | Prost | 152/154.2 |
| 2010/0217471 A1 * | 8/2010 | Stenman et al. | 701/29 |
| 2011/0106350 A1 * | 5/2011 | Jalbout et al. | 701/22 |
| 2011/0238251 A1 * | 9/2011 | Wright et al. | 701/22 |
| 2013/0006440 A1 * | 1/2013 | Petrucci et al. | 701/1 |
| 2013/0046439 A1 * | 2/2013 | Anderson et al. | 701/36 |
| 2013/0158798 A1 * | 6/2013 | Igarashi | 701/37 |
| 2013/0185005 A1 * | 7/2013 | Petrucelli et al. | 702/50 |
| 2013/0234847 A1 * | 9/2013 | Carson et al. | 340/449 |
| 2013/0259619 A1 * | 10/2013 | Shirao | 414/685 |
| 2013/0342341 A1 * | 12/2013 | Simmerman et al. | 340/449 |

* cited by examiner

*Primary Examiner* — Helal A Algahaim
*Assistant Examiner* — Kelly D Williams

(57) ABSTRACT

A tire tread temperature sensing and display apparatus, system and method are disclosed. The apparatus comprises a temperature sensor, a controller and a display. The sensor is configured to be mounted to a vehicle and to sense tire tread temperature. The controller is configured to receive and process temperature measurements and to communicate to a display, the display configured to display temperature related information in response to communication from the controller.

20 Claims, 6 Drawing Sheets

Text Display Option

Front Tires Average 197.7 F

Rear Tires Average 168.8 F

Front Tires are hotter than the Rear. Vehicle is Pushing / Understeering.

Problem / Solution:

(1) Front Spring or Sway Bar too stiff or not enough stiffness in Rear Spring or Sway Bar (2) Front air pressure too low or Rear air pressure too high (3) Front Tires are too narrow or Rear Tires are too wide

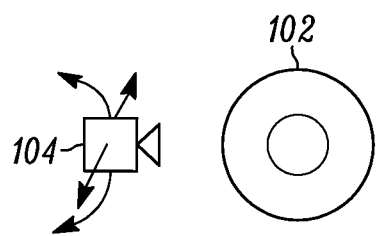
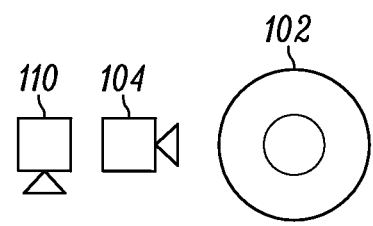
FIG. 2                    FIG. 3
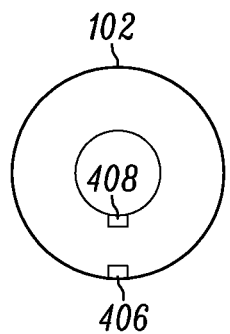
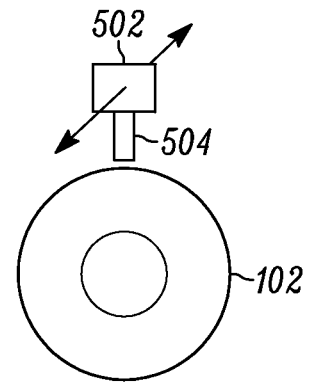
FIG. 4                    FIG. 5

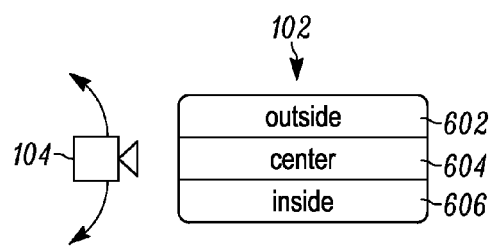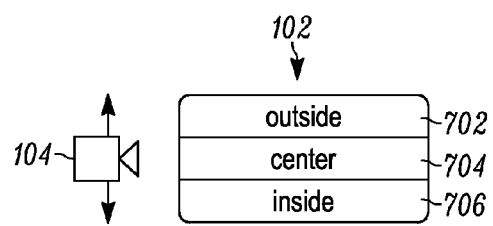
FIG. 6  FIG. 7
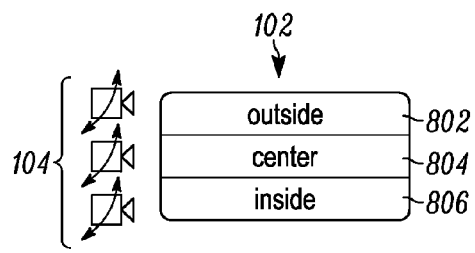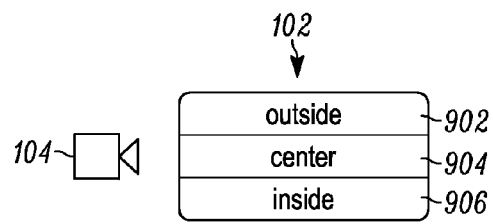
FIG. 8  FIG. 9

Text Display Option

Front Tires Average 197.7 F

Rear Tires Average 168.8 F

Front Tires are hotter than the Rear. Vehicle is Pushing / Understeering.

Problem / Solution:

(1) Front Spring or Sway Bar too stiff or not enough stiffness in Rear Spring or Sway Bar (2) Front air pressure too low or Rear air pressure too high (3) Front Tires are too narrow or Rear Tires are too wide

TIRE TREAD TEMPERATURE SENSOR AND DIAGNOSTICS FOR IN-VEHICLE DISPLAY

BRIEF DESCRIPTION OF THE DRAWINGS

For a more complete understanding of the disclosure, reference should be made to the following detailed description and accompanying drawings wherein:

FIGS. 2-5 comprise schematic side views of various exemplary configurations of temperature measuring devices;

FIGS. 6-9 comprise schematic top views of various exemplary configurations of temperature measuring devices;

Figure 1:
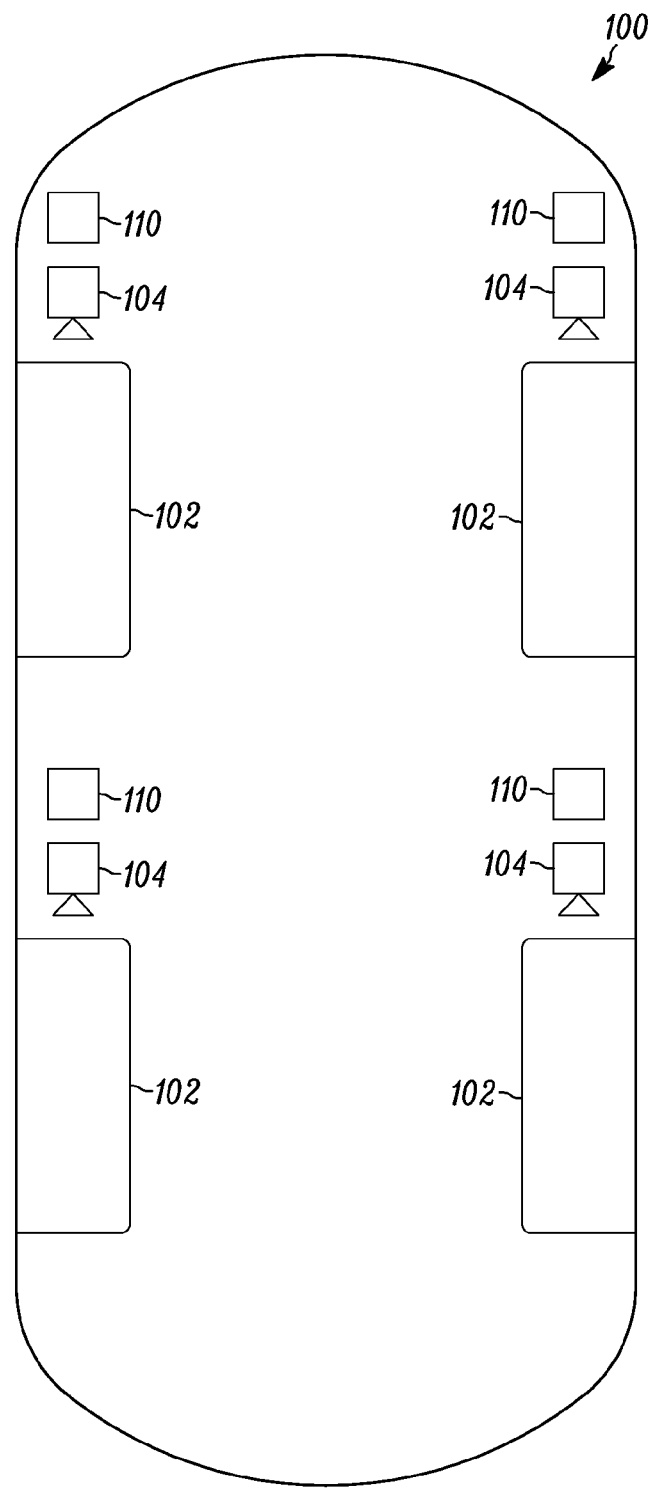
FIG. 1 comprises a schematic top view of a car fitted with temperature measuring devices.

Skilled artisans will appreciate that elements in the figures are illustrated for simplicity and clarity and have not necessarily been drawn to scale. For example, the size dimensions and/or relative positioning of some of the elements in the figures may be exaggerated relative to other elements to help to improve understanding of various aspects of the present invention. Also, common but well-understood elements that are useful or necessary in a commercially feasible embodiment are often not depicted in order to facilitate a less obstructed view of these various aspects of the present invention. Furthermore, it will be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Tire traction is often dependent on the temperature of the tire and the road surface. Although all-season tires are compounded to provide adequate traction over a wide range of temperatures they do not provide optimal traction in environments where the temperature of the tire can be maintained within a relatively narrow range. For example, in high performance cars, sports cars, and racing applications, the tire used is rarely an all-season tire. Instead, these applications often utilize high performance or three-season tires which provide significantly higher levels of traction albeit within relatively narrow ranges. For instance, while such tires perform extremely well in relatively high temperatures, such as, for example, in the range of about 194 F to about 212 F, these tires perform extremely poorly when the tire tread temperature is low. For most three-season street tires, anything below 40 F is often considered unsafe. However, for a DOT-R racing tire or a racing slick, the danger threshold for cold temperature is significantly higher. This is because the coefficient of friction between the compound in the tire tread and the pavement is substantially reduced at temperatures approaching the glass transition temperature of the compound. However, it will be understood that although all-season tires are designed and compounded to mitigate the loss of traction at lower temperatures at the cost of optimal traction at higher temperatures, the phenomenon of reduced traction in lower temperatures and increased traction at higher temperatures nonetheless affects all-season tires, albeit to a lesser degree.

In addition, when some tires become too hot, they become slippery or greasy thus also loosing traction. For example, for street tires the maximum operating temperature is generally below 180 F, for DOT-R tires the typical recommended operating temperature is between 180-200 F, for racing slicks the maximum operating temperature is over 200 F. It should be understood that the preceding operating ranges are only examples. Actual operating temperatures depend on the manufacturer, design, and tire compound used.

Since tire traction is an important characteristic of the tire, it is desirable to measure or estimate this tire characteristic at least based on measurements of factors that affect it, such as, for example, temperature, and more precisely tire temperature, tire tread temperature, driving surface temperature, or otherwise.

With reference to FIG. 4, one way of sensing the tire temperature is through the use of wheel mounted sensors 408, such as, for example, tire pressure monitoring system (TPMS) sensors which sense or measure, often among others, the temperature and pressure of the gas inflating the tire and transmit the data to a receiver for potential analysis. While, this method is often very convenient, it does not serve as a good indicator of the temperature of the tire tread and especially the tire tread surface, which is chiefly responsible for tire traction, because tire compounds and inflation gases are good thermal insulators.

With reference to FIG. 5, another way of sensing the tire tread temperature is by using a tire pyrometer probe 504. The tire pyrometer probe 504 after being inserted into the tread blocks are often the most accurate tire tread temperature sensors. However tire pyrometer probes can be typically inserted only when the tires are not moving, for example while stopped at red lights or during pit stops. Nonetheless, because this method is so accurate it may be desirable to utilize it regardless of its drawbacks by automating probe insertion when the vehicle is stopped.

With renewed reference to FIG. 4, yet another way of sensing the tire tread temperature is embedding thermocouples 406 inside the tire and transmitting signals indicative of the temperature, for example wirelessly or otherwise. Optionally, the thermocouples may be communicatively coupled to TPMS sensors 408 to improve the quality of the tire tread temperature data. The TPMS sensors may in turn evaluate the data or relay it on to another system either wirelessly or otherwise.

With reference to FIGS. 2-3 and 6-9, yet another way of sensing the tire tread temperature is measuring the tire's infrared emissivity. The infrared emissivity may be sensed by a contactless temperature sensor 104, for example by an infrared or laser thermometer, an infrared camera, or otherwise.

With reference to FIG. 1, in an example, the tire 102 temperature sensor 104 is mounted to the vehicle 100. In an aspect, the temperature sensor 104 is configured to measure the temperature while the vehicle is in operation. In an aspect, the temperature sensor 104 is configured to measure the tire tread temperature while the vehicle is driving. In another aspect, the temperature sensor 104 is configured to measure the tire tread temperature while the vehicle is stopped. In an aspect, the temperature data is transmitted for displaying of relevant tire tread temperature related information, for example tire tread temperatures, to a driver, another operator, or otherwise.

With continued reference to FIG. 1 and reference to FIG. 3, a separate temperature sensor 110 may be directed at the ground to gather driving surface temperature. However, with reference to FIG. 2, the same sensor 104 that senses the tire tread temperature may also be configured to sense the ground temperature, for example by pivoting to a downward direction.

With reference to FIG. 5, in an example, the sensor 104 comprises a tire pyrometer system comprising a pyrometer probe 504 and an actuator 502. The pyrometer probe 504 is inserted by the actuator 502 into the tire 102 tread blocks when the wheels stop. In this example, the vehicle wheel-well houses the pyrometer probe 504, which is extended by and actuator 502 at precise locations and times to sense tire tread temperature.

With reference to FIGS. 6-9, in an example, measurements of at least three areas of each tire are taken: the inside tread, the center tread and the outside tread. In an aspect, the inside and outside tread temperature measurements are taken of the area about 1 inch from the tread's shoulders and the center measurement is taken of the area in the center of a tread block. However, it is contemplated that in some examples measurements of more or less than three areas of each tire tread are taken.

With reference to FIGS. 6-7, in an example, the temperature sensor 104 is in a pivoting FIG. 6 or laterally moveable FIG. 7 relationship with the tire 102. In an aspect, the relative movement of the sensor 104 with respect to the tire 102 is used either to measure multiple areas 602-606 and 702-706 respectively or to account for the lateral displacement of tire, for example during a turn. In an aspect, a single temperature sensor 104 sweeps the tire 102 by pivoting FIG. 6 or moving laterally FIG. 7 with respect to the tire 102.

With respect to FIG. 8, in another aspect, each area 802-806 of the tire 102 is measured by a dedicated sensing element of the sensor 104.

With respect to FIG. 9, in an aspect, the sensor 104 is configured to measure temperatures in all areas 902-906 of the tire 102 concurrently.

Figures 10, 11, 12:
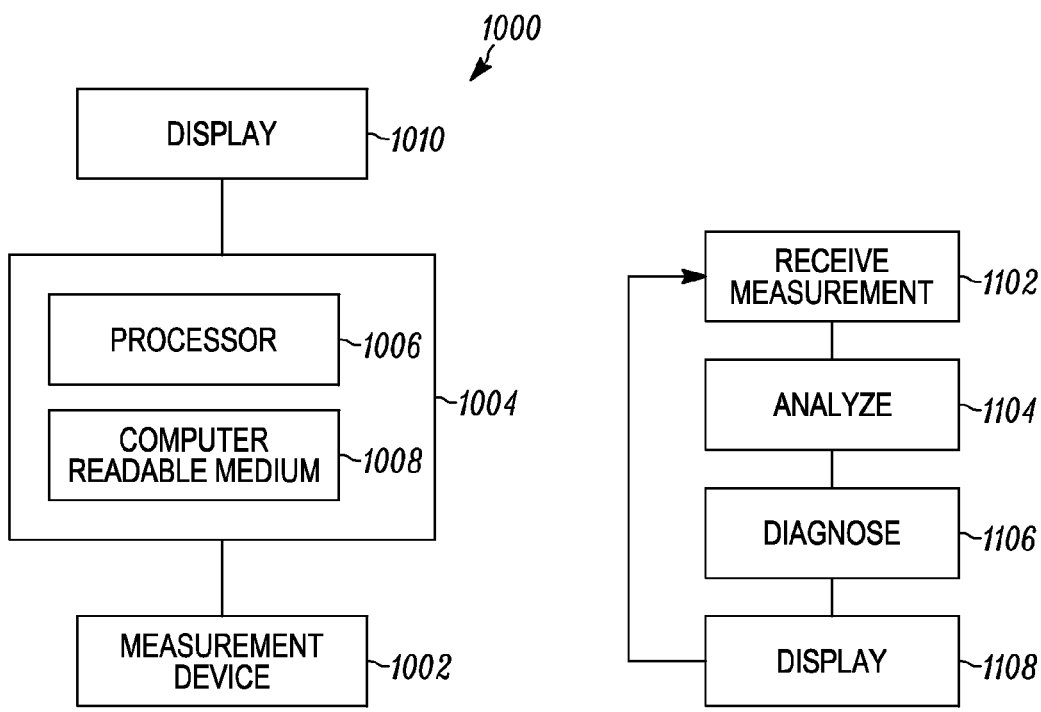
FIG. 10 comprises a schematic view of a system for processing temperature measurements.
FIG. 11 comprises a schematic view of the method for processing temperature measurements.
FIG. 12 comprises an exemplary text display screen.

With reference to FIGS. 10 and 1, the tire tread temperature measurement system 1000 comprises a controller 1004 communicatively coupled to the measurement device 1002. The measurement device 1002 comprises at least one temperature sensor 104 and optionally a driving surface temperature sensor 110. The controller 1004 comprises at least one processor 1006 communicatively coupled to a computer readable medium 1008, the computer readable medium not being a transient signal, the medium configured to store data or instructions for processing the measurements. The controller 1004 is optionally communicatively coupled to a display 1010, the display 1010 configured to display tire tread temperature related information, for example tire tread temperature, road temperature, temperature diagnosis, warnings, or otherwise, to the driver, in response to communication from the controller.

In an example, the controller is configured to be disposed within the vehicle. In an aspect, the controller is mounted to the vehicle. In an example, the display is configured to be disposed within the vehicle. In an aspect, the display is configured to be mounted to the vehicle.

In another aspect, the controller 1102 may be configured to be a part of a feedback loop system which will allow the exhaust to heat the tires. In this aspect, the system funnels a small portion of the exhaust gas onto the tires until the tires 102 at least start approaching race temperature.

With reference to FIG. 11, in an aspect, the controller 1004 receives 1102 and analyzes 1104 the measurements to arrive at percentage of the maximum traction available or the relative safety of driving on the type of tires mounted under the particular conditions for displaying 1108 to the driver. The controller may also be configured to optionally diagnose the temperature measurements for displaying 1108 of the diagnosis to the driver, or otherwise.

Figure 13:
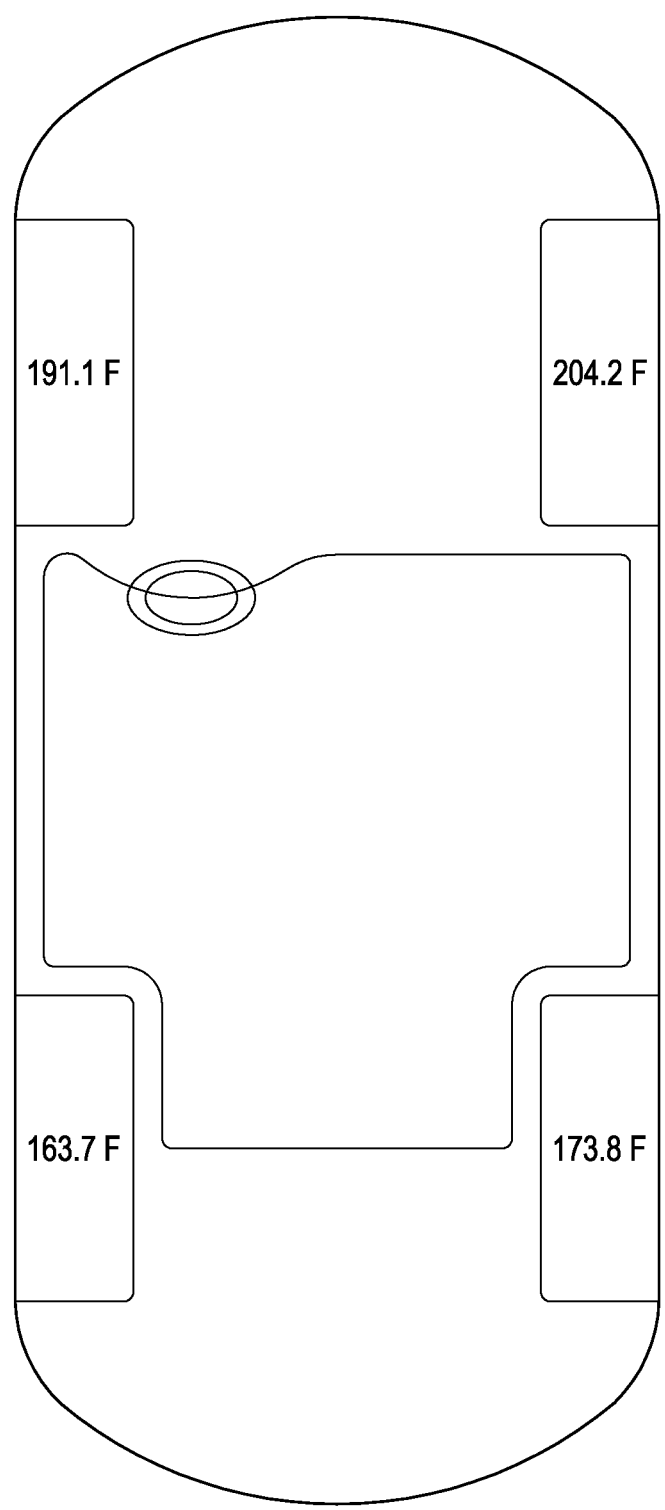
FIG. 13 comprises an exemplary pictorial display screen.
Figure 14:
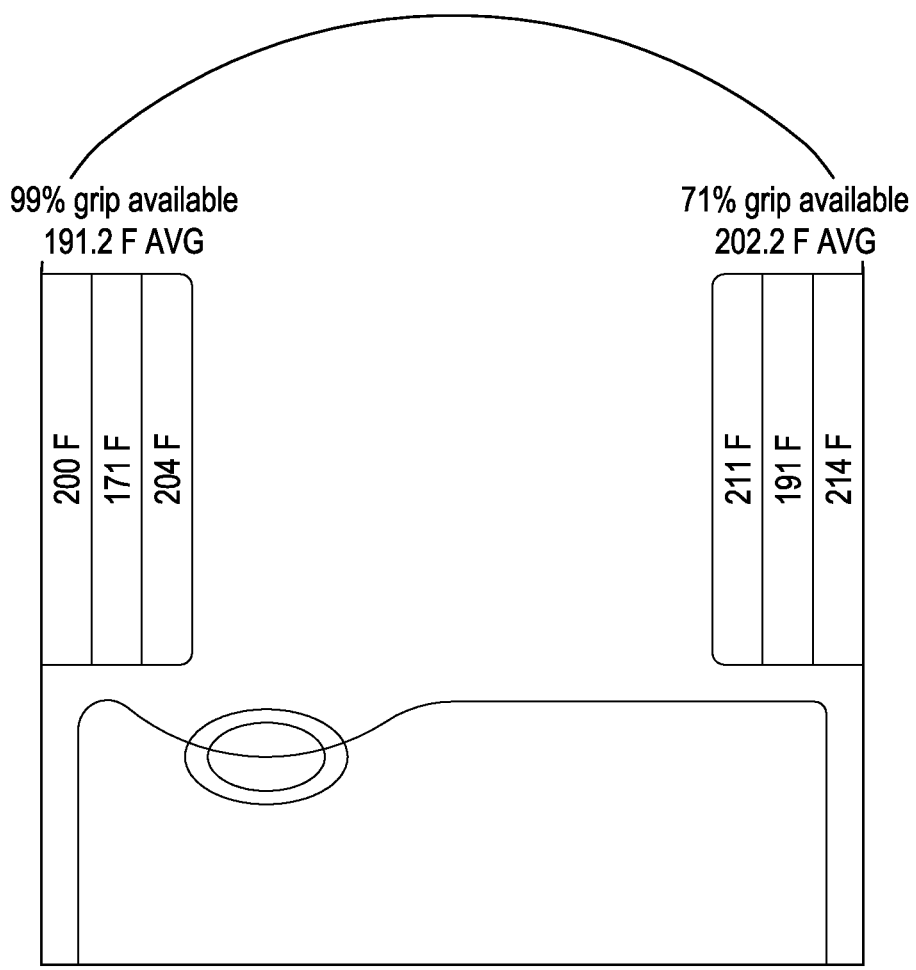
FIG. 14 comprises a partial advanced exemplary pictorial display screen.

With reference to FIGS. 12-14, in an example, of relevant tire tread temperature related information is displayed in real time, for example on in-cockpit information.

With reference to FIG. 13, the driver is informed of the temperature of each tire. In an aspect, the tire tread temperature indicators are color coded depending on the tire tread temperature so that the driver can quickly glance and gather tire tread temperature data. Accordingly, the driver can adjust his/her driving style while driving, without having to get out of the car to take a tire tread temperature measurement. In an aspect, the driver is notified that the front tires are hot (red). In response to the notification the driver may adjust the driving to make the car understeer less or oversteer more. In another aspect, the driver is notified that all the tires are hot (red). In response to the notification the driver may slow down in the corners, brakes less, or accelerate slower to allow the tires to cool down until they reach optimum temperature. In yet another aspect, the driver is notified that all the tires are too cold (blue). In response to the notification the driver may load the tires more before pushing or racing the vehicle With reference to FIG. 14, in addition to the temperature data the driver is informed of the percentage of the maximum available traction is available. In another example the driver is informed whether it is safe or unsafe to drive on the type of tires mounted under the particular driving conditions.

With reference to FIG. 12, in an example, a system provides diagnosis and suggests possible corrective actions on the basis of at least the tire tread temperature measurement. A listing of exemplary mappings of tire tread temperature measurements to diagnoses and potential corrective actions is provided herein:

The center of the tread being hotter than the inside and outside of the tread suggests that the tire pressure is too high. The tire pressure should be reduced by 1 psi for each 5 F delta.

The inside and outside of tread being hotter than the center of the tread suggests that the tire pressure is too low. The tire pressure should be increased by 1 psi for each 5 F delta.

The inside of the tread being hotter than the outside of the tread suggests too much negative camber.

The outside of the tread being hotter than the inside of the tread suggests not enough negative camber or too much toe-in.

Tire tread temperature below the ideal temperature range suggests that the tire pressure is too high, the tire is too wide, or the springs or sway bars are too stiff on the particular axle.

Tire tread temperature above the ideal temperature range suggests that the tire pressure is too low, the tire is too narrow, or the springs or sway bars are too soft on the particular axle.

The front tires' treads being hotter than the rear tires' treads suggests that the car is understeering (pushing). The front springs or sway bar may be too hard, the rear springs or sway bar may be too soft, the front tire pressure may be too low, the rear tire pressure may be too high, the front tires may be too narrow, or the rear tires may be too wide.

The rear tires' treads being hotter than the front tires' treads suggests that the car is oversteering (loose). The rear springs or sway bar may be too hard, the front springs or sway bar may be too soft, the rear tire pressure may be too low, the front tire pressure may be too high, the rear tires may be too narrow, or the front tires may be too wide.

It should be understood, that although such diagnoses and potential corrective actions may be displayed to the driver in real-time, some of the issues may not be correctable with a mere change in driving style and may require equipment adjustments or changes, for example during a pit stop.

Some other warnings that may be displayed to the driver based on tire or driving surface temperature include:

If a tire or the driving surface temperature is below 40 F, the display may display or flash a warning that the temperature is too low for safe driving.

If a tire is too hot the display may display or flash a warning that the temperature is too high for safe driving.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention. Further, those skilled in the art will recognize that the approaches described herein may also be used in systems sensing, analyzing and diagnosing temperature of movable devices and surfaces other than tires and driving surfaces.

What is claimed is:

1. A tire tread temperature sensing apparatus comprising:
   a measurement device comprising a temperature sensor, the temperature sensor configured to be mounted to a vehicle, the temperature sensor further configured to sense temperature of a tire's tread;
   a controller, the controller configured to receive and analyze temperature measurements, to diagnose vehicle state based on the analysis, and to communicate to a display; and
   a display configured to display information based on the diagnosis of the vehicle state,
   wherein the information comprises an indication of a possible corrective action, and
   wherein the information further comprises an indication of percentage of maximum traction available based at least in part on the analysis of the temperature measurement and a type of tire mounted, wherein the type of tire mounted is indicative of the tire's operating temperature range.

2. The apparatus as recited in claim 1, wherein the temperature sensor comprises an infrared thermometer.

3. The apparatus as recited in claim 1, wherein the temperature sensor comprises a thermal camera.

4. The apparatus as recited in claim 1, wherein the temperature sensor comprises a thermocouple embedded in the tire's tread.

5. The apparatus as recited in claim 1, wherein the temperature sensor comprises an actuator for positioning the sensing element relative the tire's tread.

6. The apparatus as recited in claim 5, wherein the sensing element comprises a tire pyrometer probe.

7. The apparatus as recited in claim 1, wherein the temperature sensor is configured to sense temperature of at least three areas of the tire's tread.

8. The apparatus as recited in claim 7, wherein the at least three areas comprise the inner, the outer and the center tread.

9. The apparatus as recited in claim 1, wherein the display is configured to display the individual tire's tread temperature.

10. The apparatus as recited in claim 9, wherein the individual tire's tread temperature is displayed as a color.

11. The apparatus of claim 9, wherein the individual tire's tread temperature comprises temperature of at least three areas of the tire's tread.

12. The apparatus as recited in claim 1 further comprising a temperature sensor configured to sense driving surface temperature.

13. A method of diagnosing tire tread temperature comprising:
   receiving tire's tread temperature measurement from a vehicle mounted measurement device;
   analyzing the tire's tread temperature measurement;
   diagnosing vehicle state based on the analysis;
   displaying information based on the diagnosis of the vehicle state,
   wherein the information comprises an indication of a possible corrective action, and
   wherein the information further comprises an indication of percentage of maximum traction available based at least in part on analyzing the tire's tread temperature measurement and a type of tire mounted,
   wherein the type of tire mounted is indicative of the tire's operating temperature range.

14. The method as recited in claim 13, wherein the information further comprises an indication of the relative safety of driving on the type of tire mounted.

15. The method as recited in claim 13, wherein the information further comprises an indication of a condition correctable with a change in driving style.

16. A system of diagnosing tire tread temperature comprising:
   a vehicle comprising at least one tire;
   a measurement device comprising a temperature sensor, the temperature sensor mounted to the vehicle, the temperature sensor further configured to sense the temperature of the tire's tread;
   a controller disposed in the vehicle, the controller configured to receive and process temperature measurements and to communicate with a display; and
   a display configured to display temperature related information in response to communication from the controller
   wherein the information comprises an indication of a possible corrective action, and
   wherein the information further comprises an indication of percentage of maximum traction available based at least in part on analyzing the tire's tread temperature measurement and a type of tire mounted,
   wherein the type of tire mounted is indicative of the tire's operating temperature range.

17. The system as recited in claim 16 further comprising a temperature sensor configured to sense driving surface temperature.

18. The system as recited in claim 16 wherein the controller and the display are mounted to the vehicle.

19. The system as recited in claim 16, wherein the controller is configured to receive and process temperature measurements to arrive at at least one of an available amount of maximum traction and relative safety of driving on a type of tire mounted.

20. The apparatus as recited in claim 1 wherein the information further comprises an indication of the relative safety of driving on the type of tire mounted.

* * * * *